United States Patent
Kremer et al.

(10) Patent No.: US 7,454,697 B2
(45) Date of Patent: Nov. 18, 2008

(54) MANUAL AND AUTOMATIC ALIGNMENT OF PAGES

(75) Inventors: Karl Heinz Kremer, Rochester, NY (US); Karl R. Schultz, Hilton, NY (US); Jennifer S. DeYoung, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 271 days.

(21) Appl. No.: 10/790,353

(22) Filed: Mar. 1, 2004

(65) Prior Publication Data

US 2004/0181754 A1 Sep. 16, 2004

Related U.S. Application Data

(60) Provisional application No. 60/453,937, filed on Mar. 12, 2003.

(51) Int. Cl.
*G06F 17/25* (2006.01)
*G06F 17/27* (2006.01)
*G06F 17/17* (2006.01)

(52) U.S. Cl. ............... 715/251; 715/230; 715/241; 715/246; 715/247; 715/253

(58) Field of Classification Search ............ 715/515, 715/517–521, 522, 230, 241, 245, 247, 253; 382/162, 173
See application file for complete search history.

(56) References Cited

U.S. PATENT DOCUMENTS

| | | | | |
|---|---|---|---|---|
| 5,760,912 A | | 6/1998 | Itoh | 358/296 |
| 5,832,110 A | * | 11/1998 | Hull | 382/168 |
| 5,999,945 A | * | 12/1999 | Lahey et al. | 707/200 |
| 6,075,905 A | * | 6/2000 | Herman et al. | 382/284 |
| 6,324,298 B1 | * | 11/2001 | O'Dell et al. | 382/149 |
| 6,348,980 B1 | * | 2/2002 | Cullen et al. | 358/1.9 |
| 6,616,359 B1 | * | 9/2003 | Nakagiri et al. | 400/582 |

(Continued)

FOREIGN PATENT DOCUMENTS

EP     1 100 257     5/2001

OTHER PUBLICATIONS

Reinhard Zierke, CTAN submission—pdfcrop 1.1, http://lists.dante.de, p. 1, Https://lists.dante.de/pipermail/ctan-ann/2002-October/000443.html.*

(Continued)

*Primary Examiner*—Wilson Tsui (57) ABSTRACT

A printing machine has a computer program for aligning pages in a book and printing the book. A user scans pages of a book into a controller or computer where the pages are converted into a file that is independent of the platform that created the documents such as portable document formatted (PDF) pages. Each PDF page comprises content areas of text or graphics or both and non-content areas surrounding the content areas. The program does not remove the non-content area for any placement purposes and temporarily crops the page to determine the size (and position) of the content area. During automatic alignment, the program operates on the files to temporarily crop or remove peripheral, non-content areas and generate cropped PDF pages of the content areas on the pages of the book. The cropped PDF files include one image although it may encompass text and graphics. The program may operate in automatic or manual mode.

15 Claims, 8 Drawing Sheets

U.S. PATENT DOCUMENTS

| | | | | |
|---|---|---|---|---|
| 6,738,154 | B1* | 5/2004 | Venable | 358/1.15 |
| 7,010,745 | B1* | 3/2006 | Shimada et al. | 715/517 |
| 7,187,810 | B2* | 3/2007 | Clune et al. | 382/294 |
| 2001/0033688 | A1* | 10/2001 | Taylor | 382/181 |
| 2002/0025082 | A1* | 2/2002 | Kaushikkar et al. | 382/294 |
| 2002/0059337 | A1* | 5/2002 | Takaoka et al. | 707/500 |
| 2002/0067502 | A1* | 6/2002 | Hansen | 358/1.15 |
| 2002/0090124 | A1* | 7/2002 | Soubelet et al. | 382/128 |
| 2002/0138508 | A1 | 9/2002 | Wiechers et al. | 707/500 |
| 2002/0173723 | A1* | 11/2002 | Lewis et al. | 600/473 |
| 2002/0188635 | A1* | 12/2002 | Larson | 707/515 |
| 2003/0012435 | A1* | 1/2003 | Forde | 382/167 |
| 2003/0103238 | A1* | 6/2003 | MacLean et al. | 358/1.18 |
| 2003/0167271 | A1* | 9/2003 | Arnold et al. | 707/10 |
| 2003/0173404 | A1* | 9/2003 | Chung et al. | 235/386 |

OTHER PUBLICATIONS

Altamura et al, Transforming paper documents into XML format with Wisdom++, Nov. 7, 2000, IJDAR, pp. 1-9.*

"Precise Page Positioning (PPP) For Scanned Images" Internet Archive Online Publication, Sep. 18, 2000, Retrieved from the internet: URL: http://web.archive.org/web/20000918133519 http://www.elan-gmk.com/brochures/ppp_brochure_4pg_1r.pdf.

* cited by examiner

MANUAL AND AUTOMATIC ALIGNMENT OF PAGES

RELATED APPLICATIONS

This application claims the benefit of the filing date Provisional Application Ser. No. 60/453,937 filed Mar. 12, 2003 entitled "MANUAL AND AUTOMATIC ALIGNEMENT OF PAGES".

BACKGROUND

This invention relates to printing books from scanned pages and particularly concerns aligning the pages in the printed book.

A Portable Document Format (PDF) file is a self-contained cross-platform document. It is a file that will look the same on the screen and in print, regardless of what kind of computer or printer someone is using and regardless of what software package was originally used to create it. A PDF file contains the complete formatting of the original document, including font information and images. A user may compress the PDF file and this allows complex information to be stored, transmitted and downloaded efficiently. The PDF file format was developed by Adobe Systems. PDF captures formatting information from a variety of desktop publishing applications, making it possible to send formatted documents and have them appear on the recipient's monitor or printer as they were intended. The PDF file format captures all the elements of a printed document as an electronic image that can be viewed, navigated, or printed. In the PDF format, all the text information is still available as text, all graphics are still stored as vector graphics, and images are still images. PDF files are more than images of documents. PDF files can have embedded resources, like type fonts so that these resources are available at any viewing location.

PDF files are especially useful for documents such as magazine articles, product brochures, or flyers where a publisher wants to preserve the original graphic appearance online. A PDF file contains one or more page images. A viewer may zoom in on or out from any page and may move forward and backward. Because PDF files are cross platform files, they are widely used in the printing industry. A customer often brings to a printer documents that are in different formats and asks the printer to arrange the documents into a book. Other times a customer has a hard copy of book that he wants to reproduce and the easiest method of reproduction is to copy the pages on a photocopy machine and sort the pages into books.

To scan a book and therefore convert it to an electronic version that can be printed on a production printer, the book is cut at the spine and then scanned page by page. This creates originals that no longer contain perfectly aligned page images. When the raw scan data is printed, the pages appear to "jump" around when one browses through the book. Because of that, there is a need to either automatically or manually align the pages prior to printing. This invention assumes a PDF based workflow. It is also assumed that the application providing these features is implemented as an Acrobat plug-in. All image pre-processing like deskew or despeckle are performed before the pages are aligned in accordance with one of the following procedures. This pre-processing may automatically be initiated by the alignment function before the actual page alignment.

SUMMARY

The invention provides a computer program for operating a printing machine. It includes a method of operating the machine as well as the machine that operates the method of the program. In particular, the invention provides a method, apparatus and program for aligning pages in a book and printing the book. With the invention a user scans pages of a book into a controller or computer where the pages are converted into a file that is independent of the platform that created the documents. In the preferred embodiment the computer converts the scanned pages into portable document formatted (PDF) pages. Each PDF page comprises content areas of text or graphics or both and non-content areas surrounding the content areas. The program determines a bounding box around the content areas for placement purposes and to determine the size (and position) of the content area. As such the page is temporarily cropped in order to asses its content area and align its content area with other pages. As soon as this information is available, the cropped image is discarded again. The original image is moved by the amount determined through this operation. During automatic alignment, the program operates on the files to temporarily crop or remove peripheral, non-content areas and generate cropped PDF pages of the content areas on the pages of the book. The cropped PDF files normally includes one image per page although it may encompass text and graphics. The program may operate in automatic or manual mode. In other words, the program processes the PDF formatted document to define the minimal content areas that include all of the information (text, graphics and images) on the page. This is called a "cropped" image for purposes of explaining how the program works. No portion of the document is actually removed. In either automatic or manual mode, either the program or the user selects a feature of the cropped PDF pages common to all the PDF pages. The rest of the pages are aligned to the selected feature and the book is printed.

The manual method lets the user select one or more group(s) or subset(s) of PDF pages. Then the user previews the selection and chooses a standard page and a feature on the standard page that is suitable for aligning to other pages. The user places a first cursor on the standard feature of the content of the previewed PDF page. The other pages are each previewed and each subsequent page displays the first cursor in the position selected on the standard page. The program places a second cursor on the second and subsequent pages and lets the user move the image as a block to align the cursors to one another and thereby manually align the pages.

DETAILED DESCRIPTION

Automatic Alignment

All scanned pages usually contain white space around the actual page content. The alignment program removes the white space by cropping the page. In operation, the scanned pages are converted into PDF pages and at least one reference point (e.g. upper left corner) is always placed at the same position. Removing the white space is relatively easy for true scanned PDF pages and is readily implemented by one skilled in the art. The cropped pages contain only one PDF object: The scanned image. Only ordinary skill in the art is required for converting compound pages that contain more than one image object, or other PDF objects, into cropped pages with one object in a bounding box.

Figure 1:
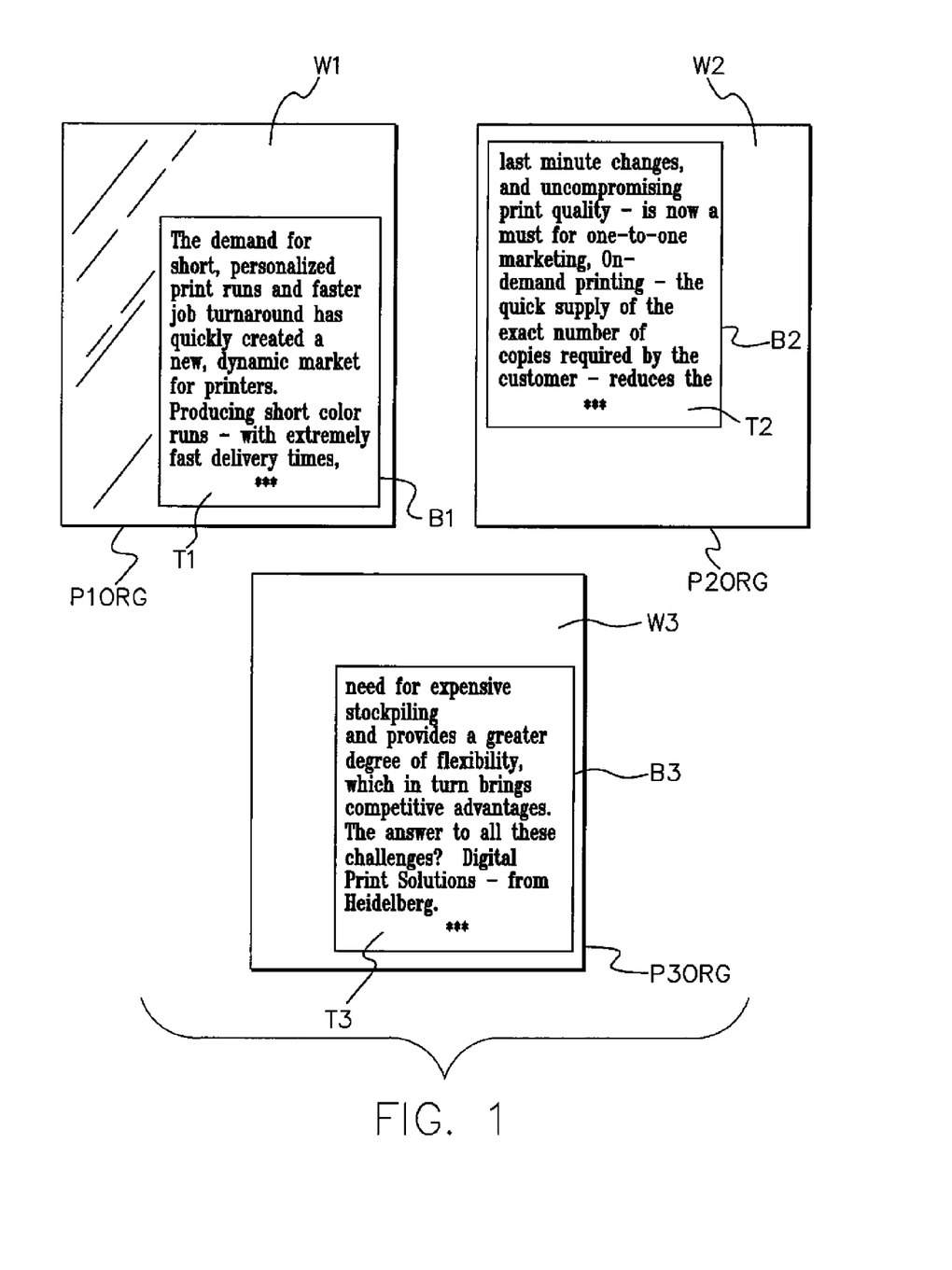
FIG. 1 shows three exemplary pages of a scanned book.

Turning to FIG. 1, there are three original scanned pages, P1ORG, P2ORG and P3ORG. Each page includes text, T1, T2, T3, respectively. The text on each page is surrounded by a border area of white or blank space, W1, W2, W3, respectively. On page P1ORG the white space W1 is indicated in cross hatch.

Scanned Pages

Figure 2:
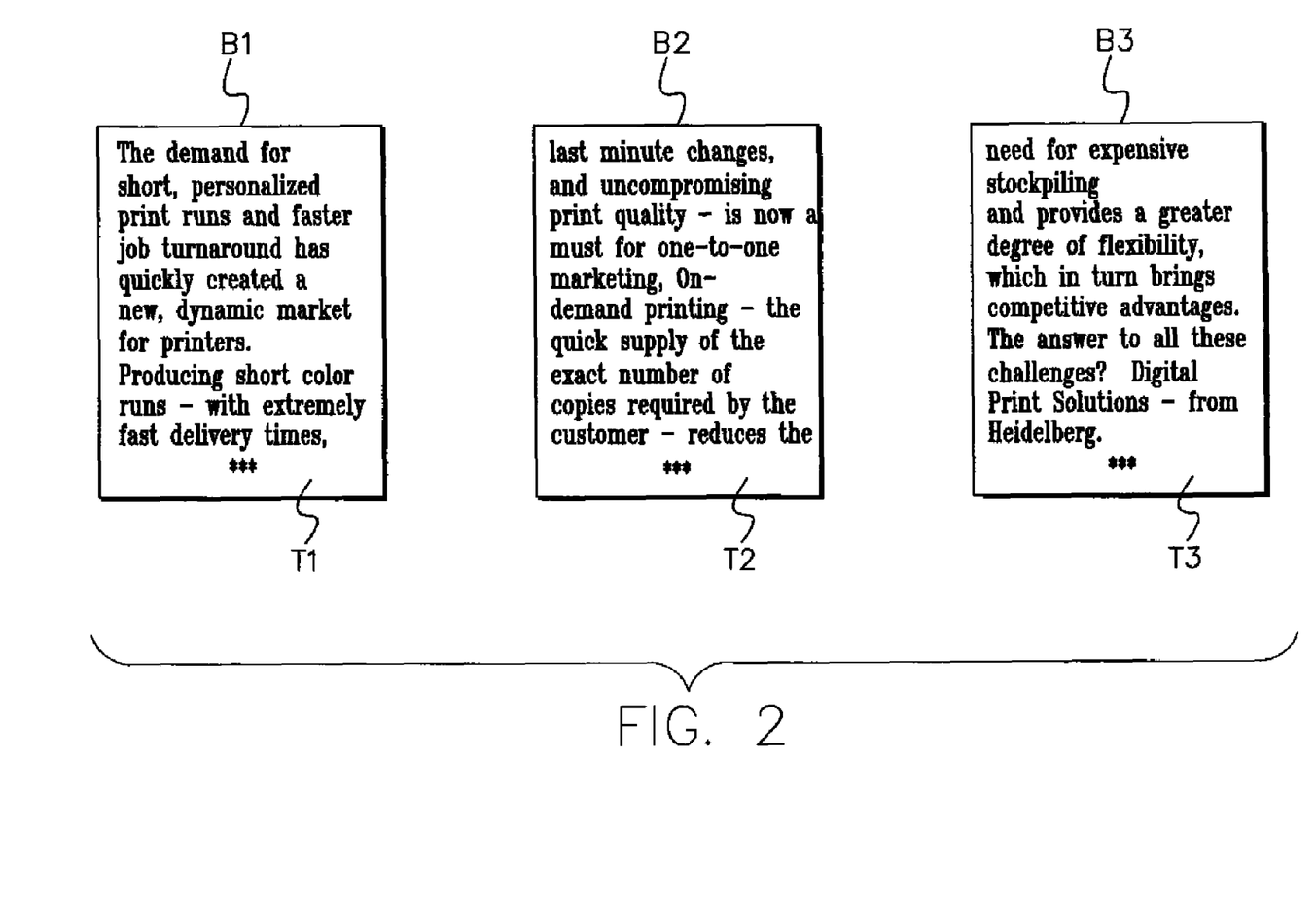
FIG. 2 shows the three exemplary pages cropped after scanning.

For scanned pages, the PDF pages will contain only one PDF object: One image containing the full page image. See FIG. 2. For these pages, the automatic alignment is relatively easy to perform. The pages are pre-processed with an "auto-crop" function, which automatically removes the white border around the page content. When the pages are cropped, the blank, border areas W1, W2, and W3 are removed and the pages are limited to their respective content areas inside transient bounding boxes B1-B3. The cropped images are essentially only the text portions, T1, T2, and T3. See FIG. 2. Each block of text T1-T3 is treated as a single object.

Figure 3:
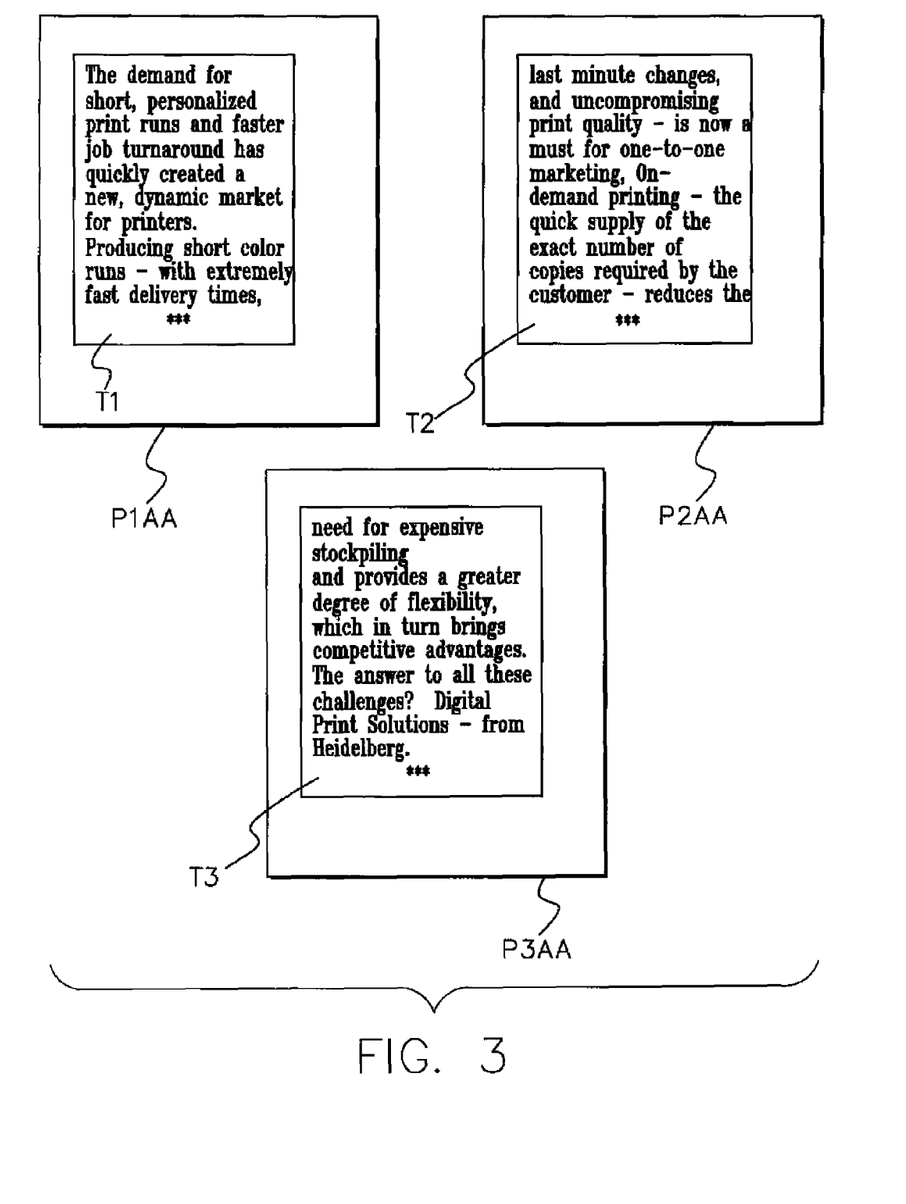
FIG. 3 shows the three pages of FIG. 1 automatically aligned.

After auto-crop, the user defines one reference point (e.g. upper left corner). The program moves the page images so that the reference point on the individual pages line up with each other. See FIG. 3 where the pages are automatically aligned as shown for pages P1AA, P2AA, and P3AA. An alternate embodiment allows the program to vote the reference point. In other words, the user need not define a reference point. Instead, the software measures the sizes of all the images T1-T3 to identify the largest page and then positions the largest page according to rules that were either defined by the user (e.g. left edge), or internal to the software. All other pages are placed according to this largest page.

Compound Pages

Figure 4:
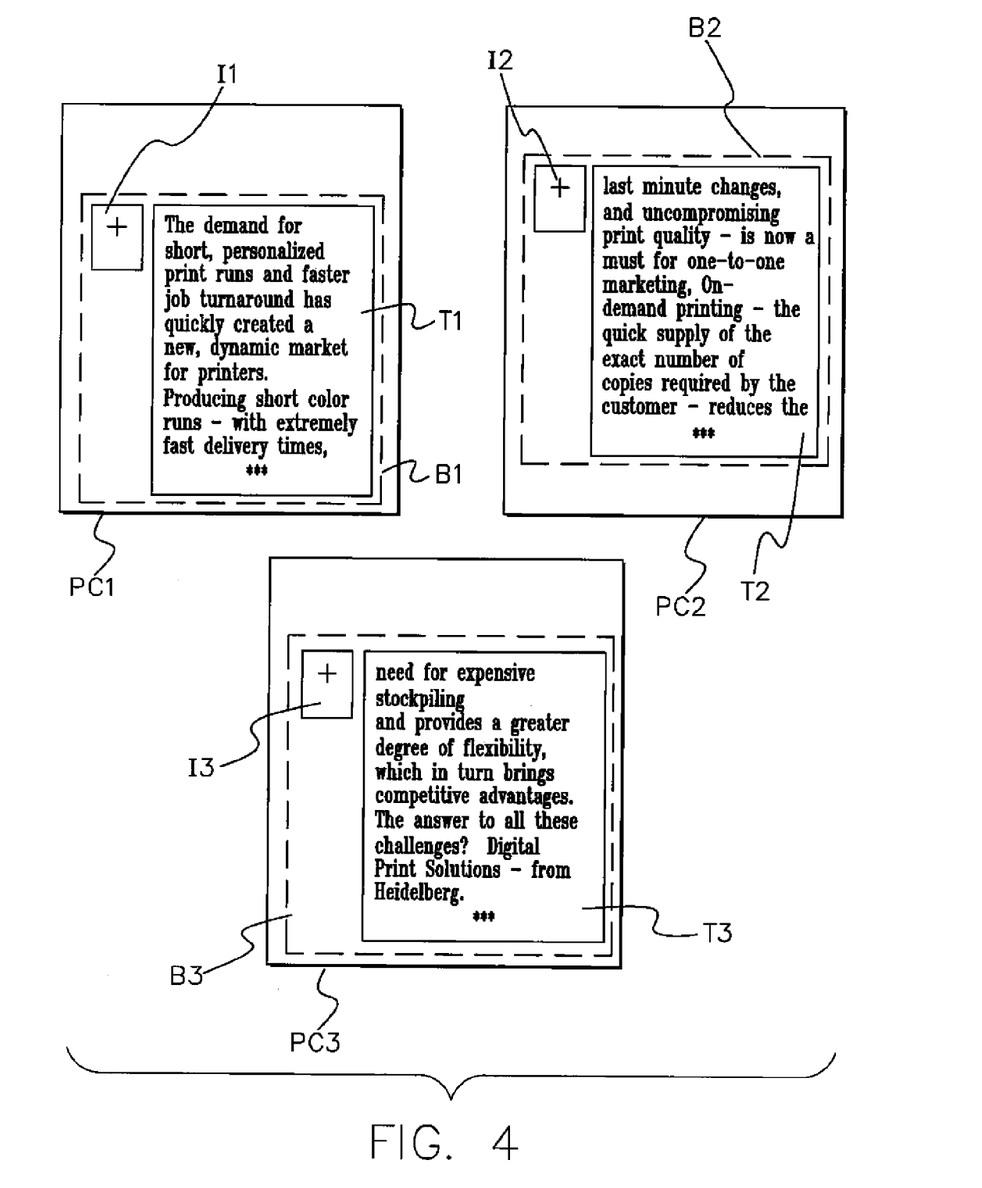
FIG. 4 shows three exemplary pages with compound images.
Figure 5:
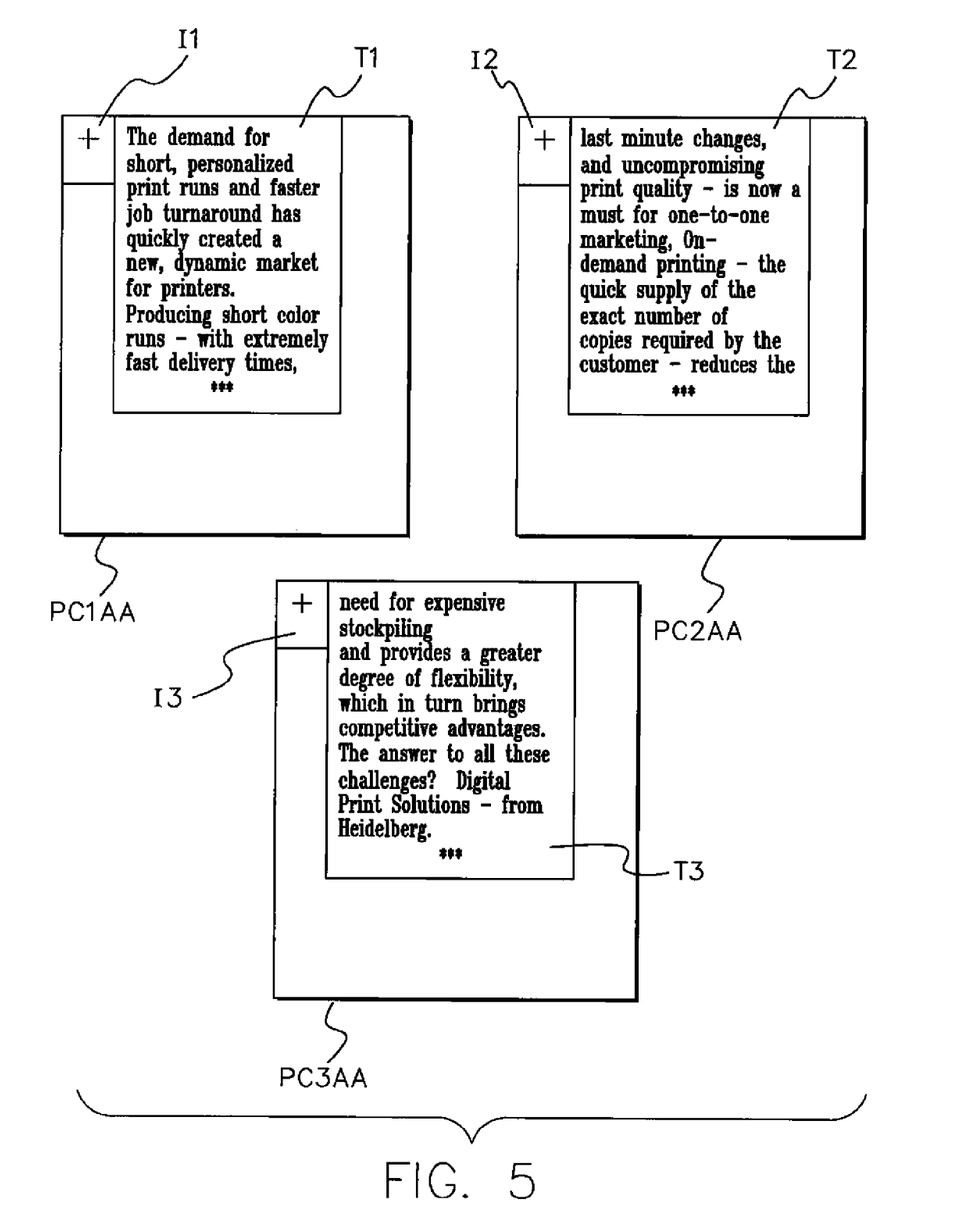
FIG. 5 shows the three pages of FIG. 4 aligned.

Books often include pages that contain text and graphics. See for example the original pages in FIG. 4 where images 11, 12, and 13 appear on the pages. If the page layout contains multiple PDF objects, in order to layout all pages in a uniform way the software makes a bounding box for all pages: The bounding box is the smallest theoretical box B1, B2, B3, that fully encloses all objects on a page. The bounding box is established by counting pixels in the scanned image. There are many ways of scanning a document to identify blocks of text and graphics and then designate those areas as objects. In this alignment program, all blocks of text and graphics are combined into one block or area that includes all text and graphics. The program creates, in effect, a large rectangular bounding box that encloses all text and graphics on a page and excludes border white space. This is done by determining the bounding boxes of all objects on the page, and then combining these bounding boxes to a resulting bounding box by iterating over all bounding boxes and comparing the bounding box of an individual object with the resulting bounding box. If the individual bounding box's lower left corner is left of the resulting bounding box's lower left corner, then the x component of the lower left corner of the resulting bounding box will be assigned the x component of the lower left corner of the individual bounding box and so on for all of lower left x, lower left y, upper right x, upper right y. Once this bounding box is established for all pages, the process continues as described in the previous section ("Scanned Pages"). In operation, the program creates a transient bounding box that includes the image and text on each page and automatically aligns the bounded objects. See the result in FIG. 5.

Page Size Comparison

The software provides a mechanism to validate the pages sizes (bounding boxes) by grouping them into similar page size groups (or subsets). If all pages have approximately the same size, they can be aligned without any manual intervention. If the software however finds a few pages that have different bounding boxes (e.g. the start of a chapter where the first page is not completely filled with text), the user can be warned. In addition to this, the software may be able to align the pages that fall into one page size group in a consistent way. The user can define new alignment rules for a group of pages with comparable page sizes.

Preview

The software provides a preview function that displays the results of the cropping alignment for one selected page without applying the changes to the actual document. The preview function either opens a new window to display the cropped aligned page view, or creates a new (temporary) document containing just the one cropped aligned page. This allows the operator to zoom into the page image to verify the correctness of the cropping operation.

Manual Alignment

Figure 6:
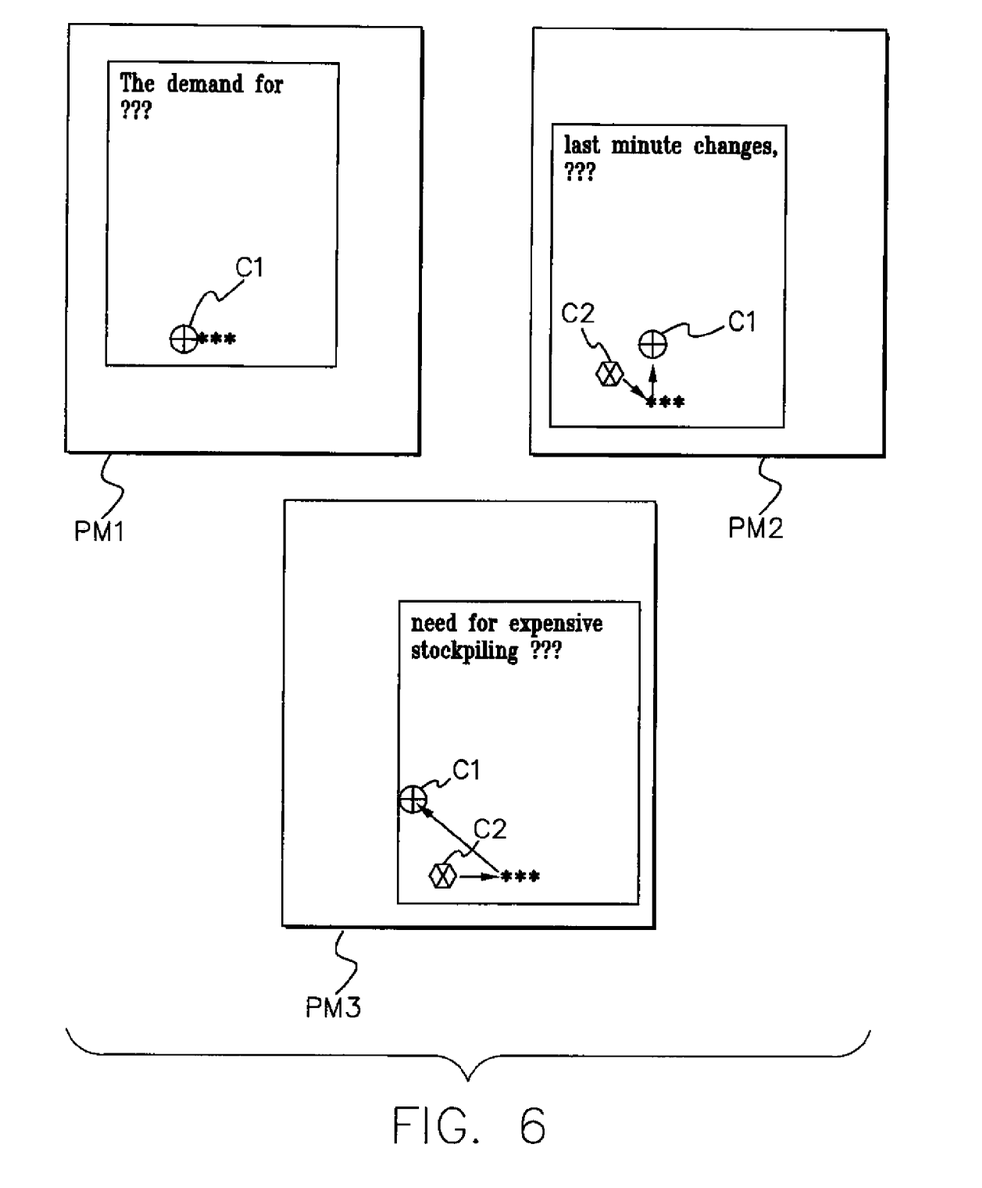
FIG. 6 shows three exemplary pages undergoing manual alignment.

For the manual alignment of the scanned pages, the operator reviews all pages and defines one page as a "standard" for all another alignment operations. Turning to FIG. 6, assume the operator selects PM1 as the standard. The operator will mark one position on this standard page that will have an equivalent position on all other pages (e.g. upper right corner of the text, left most point of a horizontal rule below the heading, left lower corner of a page number). In FIG. 6 the operator has chosen the three asterisks that appear as a footer in the center of each page and place a first cursor C1 at the end of the first asterisk. On the first page the user may move the entire text box T1 to its desired position. Once positioned, the user locates a first marker cursor C1 (e.g. a circle marker) to a position proximate the asterisks.

The first cursor circle marker C1 marks the correct "zero position" on the first page. Each subsequent page has a C1 cursor marker that shows where the zero position would be without any correction. A hexagon marker cursor C2 on the second and subsequent pages allows the user to move the "zero point" to a new location to define a point on the page which should be moved to the zero position specified by the first cursor by shifting the entire contents of the page accordingly. The names and shapes of the markers used in this description are only samples; the actual implementation of the software may use different names or shapes.

Printing Mode/Scanning Mode

Books are usually printed in duplex mode and they are often scanned in duplex mode. Usually the left and right pages of a book have a slightly different layout (e.g. a left page has the page number at the left edge, a right page has it at the right edge). The program has an option to process all front or odd pages differently from all back or even pages.

Because the document was scanned in duplex mode, it can be assumed that all front pages have odd page numbers, and all back pages have even page numbers. Therefore the program provides instructions for a computer controlled scanner and printer to process all odd page numbers with one reference setting, and all even page numbers with a different reference setting.

The user may select two different reference points, one for even and one for odd page numbers. When processing the pages, the program presents all odd numbered pages first, and after that all even numbered pages next. The advantage of this over presenting all pages in their original order is that the user could concentrate on one reference point, and would not have to jump from the left edge of a scan to the right edge for the following page. It may also be possible to further limit the set of pages to be processed by creating a page selection in Acrobat's thumbnail menu. The software would then only present the selected pages to the user for a manual page alignment.

EXAMPLE

Figure 7:
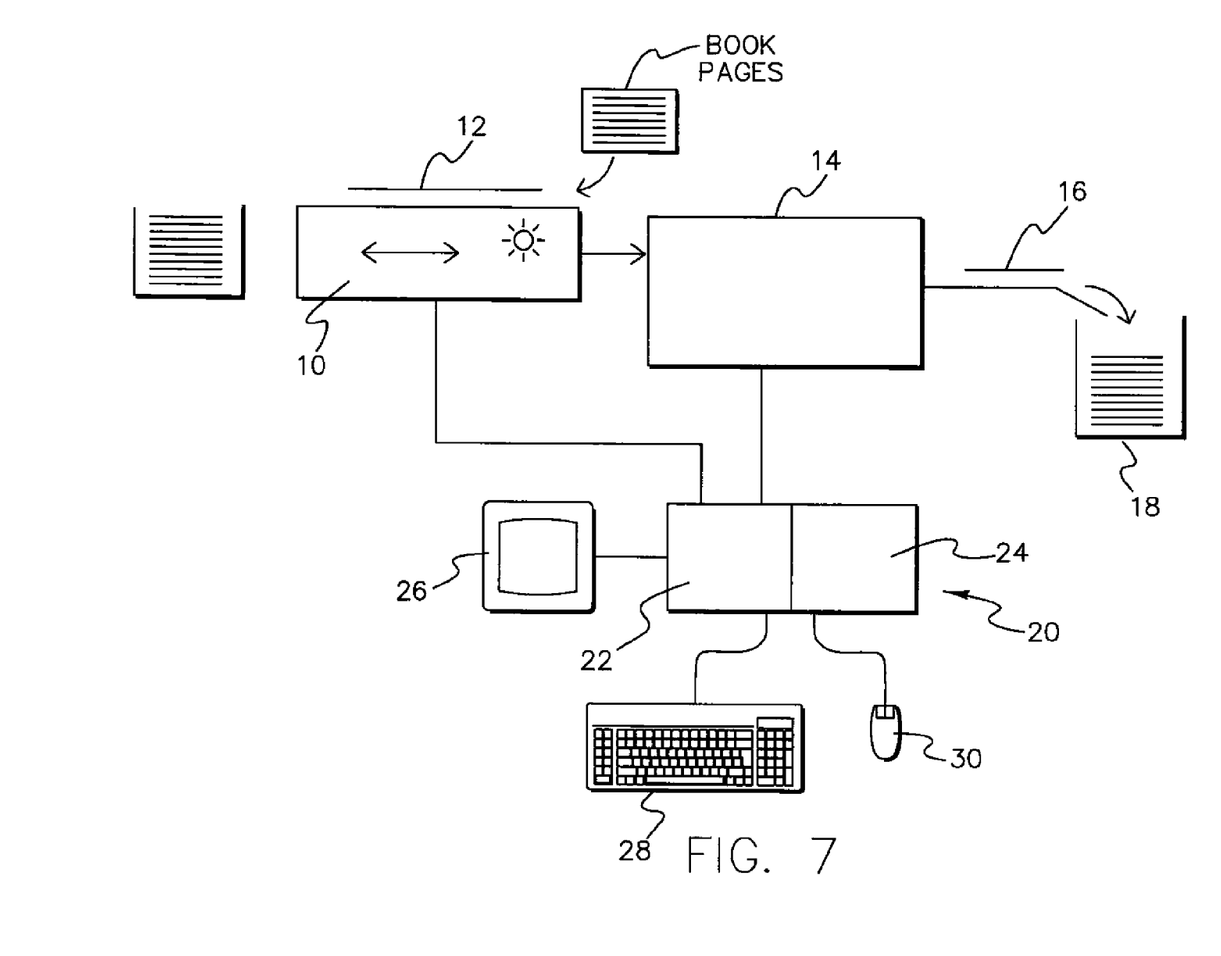
FIG. 7 is a schematic diagram of a scanner and printer equipped with the computer program of the invention.

FIG. 7 shows a schematic layout of printer 14 equipped with the computer program of the invention. The figure and the following description are generic for printers and are not limited to the particular details provided herein. Those skilled in the art understand that printers may have many different configurations. As such, the following description is provided to enable one skilled in the art to understand the environment in which the page alignment feature of the invention is employed. Exemplary printers include the Digimaster.TM. Digital High Volume Printer manufactured by Heidelberg Digital, L.L.C., located in Rochester, N.Y. and the NexPress TM color printer manufactured by NexPress, Corporation, located in Rochester, N.Y.

Scanner 10 scans a document 12. The scanner is preferably a sheet fed scanner that rapidly scans the pages of a book that has been disassembled. The scanned images are received by a controller 20 that includes a central processing unit 22 and one or more memory units 24. The memory unit(s) include random access memory and read only memory for holding data, system programs, and application programs including (and not limited to) Adobe Acrobat and the alignment program of the invention. The programs run on the CPU 22 are under control of an operator who has a display terminal 26 and input devices such as a keyboard 28 and a mouse 30.

Printer 14 has media input bins (not shown) that hold the paper for printing a book. After the alignment program is run and the print job is otherwise ready for release, the printer prints the aligned images onto the media and discharges the printed book. Other downstream options may include a cover inserter and binder or the binding may be as simple as stapling the pages together.

Figure 8:
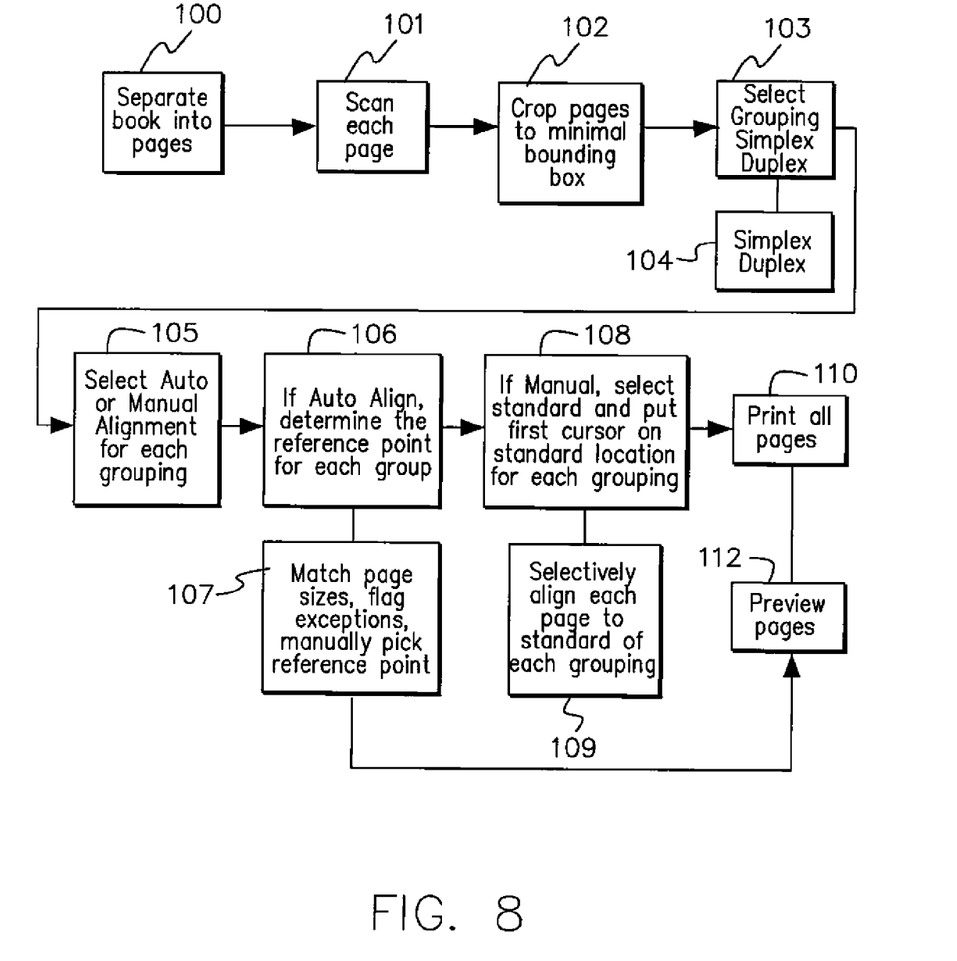
FIG. 8 is a flow diagram of the steps performed by the invention.

In operation, the book is separated into its individual pages as shown in step 100 of FIG. 8. Then the scanner 12 scans each page (step 101) and the scanned images are stored in a memory unit 24 of the controller 20. In the preferred embodiment, the CPU runs Adobe Acrobat and converts the scanned images of the pages into PDF files. The invention program then crops the PDF files in step 102 to provide the cropped bounding shown in FIG. 2. The user then operates the alignment program in step 103 to select whether the book will be aligned to one standard (simplex) to two standards (duplex) such as one for odd pages and another for even pages, or multiple standards, one for each page grouping. In step 105 the user selects automatic or manual alignment for each grouping. If automatic alignment is selected, then the user may select a standard or let the program determine a reference point for each grouping in a step 106. In a step 107 the program compares the pages in the grouping and the program identifies the largest page and aligns all the pages (or at least all the pages in the grouping) to the page with the largest bounding box in each grouping. If the user selects manual alignment (step 108) then he further selects a standard for that process (step 109). The user may preview (step 112) each page on the display 26 to see if manual alignment is needed or if the initial scanned PDF page is sufficiently close to the standard to be acceptable. After alignment is completed, the book is printed (step 110 and/or stored to disk for a later printing (or re-printing).

The invention claimed is:

1. A method for generating a portable document format (PDF) representation of a book having a plurality of pages, comprising the steps of:

scanning the pages of the book to produce scanned pages;

generating original PDF pages from respective said scanned pages, said original PDF pages corresponding to respective pages of the book, wherein said original PDF pages have content areas of text or graphics or both and non-content areas surrounding the content areas;

creating on each of said original PDF pages, a bounding box of minimal size to enclose all of the respective said content areas, each said bounding box defining a respective cropped PDF page;

further comprising using one of said cropped PDF pages as an alignment standard for said feature;

wherein said using further comprises identifying a largest of said cropped PDF pages as said alignment standard;

selecting a feature common to all of said cropped PDF pages;

wherein said selecting further comprises applying one or more predetermined alignment rules; and further comprising:

warning a user when said bounding boxes are of different sizes; and allowing the user to define new alignment rules;

discarding said cropped PDF pages;

aligning all of said original PDF pages in a PDF representation of the book using said selected feature to prevent an appearance of page jumping between succeeding pages in the PDF representation of the book.

2. The method of claim 1 further comprising displaying said cropped PDF pages used as said alignment standard during said selecting.

3. The method of claim 1 further comprising displaying the PDF representation of the book, following said aligning.

4. The method of claim 1 further comprising printing the PDF representation of the book, following said aligning.

5. The method of claim 1 wherein said feature is a corner of said cropped PDF pages.

6. The method of claim 1 wherein said feature is a page number, a header, or a footer.

7. A method for generating a portable document format (PDF) representation of a book having a plurality of pages, comprising the steps of:

scanning the pages of the book in a duplex mode having front and back scans to produce a first set of scanned pages from said front scans and a second set of scanned pages from said back scans;

generating first and second sets of original PDF pages from respective said sets of scanned pages, said original PDF pages corresponding to respective pages of the book, wherein said original PDF pages have content areas of text or graphics or both and non-content areas surrounding the content areas;

creating on each of said original PDF pages, a transient bounding box of minimal size to enclose all of the respective said content areas, each said bounding box defining a respective cropped PDF page;

further comprising using one of said cropped PDF pages of each of said sets as an alignment standard for said selecting of the respective said feature;

wherein said using further comprises identifying a largest of said cropped PDF pages in each of said sets as the respective said alignment standard;

selecting different first and second features of said cropped PDF pages, said first feature being common to all of said cropped PDF pages of said first set, said second feature being common to all of said cropped PDF pages of said second set;

wherein said selecting further comprises applying one or more predetermined alignment rules; and further comprising:

warning a user when said bounding boxes are of different sizes; and allowing the user to define new alignment rules;

discarding said cropped PDF pages;

aligning all of said orignal PDF pages in a PDF representation of the book using the respective said selected features to prevent an appearance of page jumping between succeeding pages in the PDF representation of the book.

8. The method of claim 7 further comprising displaying each of said alignment standard cropped PDF pages during said selecting of the respective said feature.

9. The method of claim 7 wherein said selecting further comprises:

displaying all of said cropped PDF pages of said first set, then all of said cropped PDF pages of said second set; and receiving a user choice of said first feature, during said displaying of said first set, and a user choice of said second feature, during said displaying of said second set.

10. The method of claim 7 further comprising displaying the PDF representation of the book, following said aligning.

11. The method of claim 7 further comprising printing the PDF representation of the book, following said aligning.

12. The method of claim 7 further comprising manually selecting said features.

13. The method of claim 7 wherein at least one of said features is a corner of the respective said cropped images.

14. The method of claim 7. wherein at least one of said features is a page number.

15. An apparatus for generating a portable document format (PDF) representation of a book having a plurality of pages, comprising:

a scanner capable of scanning the pages of the book to produce scanned pages; and a controller operatively connected to receive said scanned pages, said controller being programmed to:

generate original PDF pages from respective said scanned pages, said original PDF pages corresponding to respective pages of the book, wherein said original PDF pages have content areas of text or graphics or both and non-content areas surrounding the content areas surrounding the content areas;

create on each of said original PDF pages, a transient bounding box of minimal size to enclose all of the respective said content areas, each said bounding box defining a respective cropped PDF page;

wherein said controller uses one of said cropped PDF pages as an alignment standard for said feature;

wherein said controller identifies a largest of said cropped PDF pages as said alignment standard;

select a feature common to all of said cropped PDF pages;

wherein said controller applies one or more predetermined alignment rules to select the feature common to all of said cropped PDF pages; and wherein said controller warns a user when said bounding boxes are of different sizes; and allows the user to define new alignment rules;

discard said cropped PDF pages;

align all of said original PDF pages in a PDF representation of the book using said selected feature to prevent an appearance of page jumping between succeeding pages in the PDF representation of the book.

* * * * *